United States Patent
Mahoney et al.

(10) Patent No.: US 6,865,284 B2
(45) Date of Patent: Mar. 8, 2005

(54) METHOD AND SYSTEM FOR PROCESSING AN ELECTRONIC VERSION OF A HARDCOPY OF A DOCUMENT

(75) Inventors: Terry P. Mahoney, Boise, ID (US); Angela K. Hanson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 09/468,254

(22) Filed: Dec. 20, 1999

(65) Prior Publication Data

US 2003/0179908 A1 Sep. 25, 2003

(51) Int. Cl.[7] .......................... G06K 9/00; G10L 21/00; B42D 15/00
(52) U.S. Cl. .................... 382/112; 382/100; 704/275; 283/72
(58) Field of Search .............................. 382/137, 140, 382/100, 112, 107, 101; 235/375; 345/174; 380/246; 283/72, 74; 358/402, 403; 704/275; 348/14.01–14.16

(56) References Cited

U.S. PATENT DOCUMENTS

| | | | | |
|---|---|---|---|---|
| 5,428,694 A | * | 6/1995 | Betts et al. | 382/317 |
| 5,486,686 A | * | 1/1996 | Zdybel et al. | 235/375 |
| 5,521,991 A | * | 5/1996 | Billings | 382/317 |
| 5,732,227 A | * | 3/1998 | Kuzunuki et al. | 345/775 |
| 5,752,152 A | * | 5/1998 | Gasper et al. | 283/902 |
| 5,892,900 A | | 4/1999 | Ginter et al. | 395/186 |
| 5,901,224 A | * | 5/1999 | Hecht | 380/4 |
| 6,122,403 A | * | 9/2000 | Rhoads | 382/233 |
| 6,233,684 B1 | * | 5/2001 | Stefik et al. | 380/54 |
| 6,253,184 B1 | * | 6/2001 | Ruppert | 704/275 |
| 6,263,086 B1 | * | 7/2001 | Wang | 380/54 |
| 6,400,392 B1 | * | 6/2002 | Yamaguchi et al. | 348/14.12 |
| 2002/0085759 A1 | * | 7/2002 | Davies et al. | 382/203 |

OTHER PUBLICATIONS

Information–based indicia program (IBIP); United States Postal Service; Jan. 12, 1999.*

* cited by examiner

*Primary Examiner*—Mehrdad Dastouri

(57) ABSTRACT

A method and system in which an electronic document corresponding to a hardcopy of the document is processed. A mark is placed on the hardcopy, the mark containing identification information of the electronic document. The hardcopy document is viewed by an image capture device that captures an image of the hardcopy document. The mark on the image captured by the image capture device is decoded to determine the identification information of the electronic document. The electronic document identified based on the identification information is then processed.

20 Claims, 2 Drawing Sheets

METHOD AND SYSTEM FOR PROCESSING AN ELECTRONIC VERSION OF A HARDCOPY OF A DOCUMENT

BACKGROUND OF THE INVENTION

1. Field of the Invention

This invention relates generally to the field of processing electronic documents based on hardcopy document images captured by an image capture device. More particularly, the present invention is directed to a method and system in which a hard copy of a document is encoded with a mark so that the mark is decoded from an image of the hard copy captured by the image capture device so that an electronic version of the hard copy can be processed.

2. Background of the Related Art

Currently, systems for retrieval of electronic versions of hard copy documents require at least some manual input and are error prone. Information, generally textual or bar coded, such as an account number or an invoice number is either scanned in using specialized scanners or typed in by a data entry operator. The data entered in this manner is then processed to retrieve the electronic copy of the hard copy document. This process is both time consuming and error prone, particularly manual data entry, where a data entry operator has to enter key data (such as a document or account number) to retrieve the electronic document. The result is often retrieval and processing of incorrect documents based on data entry errors by a data entry operator.

Likewise, conventional encoding and decoding of bar codes is tedious, time consuming, and expensive. The bar code has to be encoded to the hard copy, the encoded bar code has to be decoded by a specialized device such as a bar code scanner and the scanned data has to be processed. The specialized bar code processing equipment needed adds to the cost of processing the electronic version of the document.

To solve problems such as those listed above, one prior art solution demonstrated at a Fall 1998 Comdex show, included a system with a staple attached to a document that emits Radio Frequency (RF) energy. The staple is encoded with the document retrieval information for the hard copy document that is to be processed and then affixed to the hard copy document whose document retrieval information is encoded on the staple. This document retrieval information is later retrieved from the energy emitting staple so that the electronic version of the hard copy document can be retrieved. However, this solution also has several disadvantages, including: (i) a specialized staple has be to be encoded and affixed to each hard copy document; (ii) the RF emitting staple is much more expensive than other printing marks created using toner or ink; and (iii) the decoding apparatus is a specialized, single purpose apparatus that does not have uses other than decoding the signal emitted from the energy emitting staple. Furthermore, the affixation of a staple to each document also adds to the weight and volume of the document so that such documents are more difficult to store and transport.

SUMMARY OF THE INVENTION

Therefore, it is a general objective of the invention to alleviate the problems and shortcomings identified above.

These and other objectives are achieved by providing in one aspect of the present invention, a method of processing an electronic document corresponding to a hardcopy of the document.

In a further aspect of the invention the method includes the steps of: viewing the hardcopy by an image capture device; decoding a mark captured by the image capture device to determine the identification information of the electronic document; and processing the electronic document according to the identification information.

In a preferred aspect of the invention, the hardcopy is viewed by the image capture device by moving a copy of the hardcopy in front of the image capture device.

In another aspect of the invention, the mark is created at the time of creation of a document and printed on the hardcopy of the document.

In another aspect of the invention, the mark is placed on the hardcopy by a printer including a bulk printing press or other commercial printer.

In another aspect of the invention, a mark can be copied from another hardcopy that has the mark already placed on it.

In another aspect of the invention, the mark is a bar code which includes document processing information about the document to which it is affixed.

In another aspect of the invention, the mark is a digital mark.

In another aspect of the invention, the identification information of the electronic document includes information about the processing the document, including retrieving the document for viewing in a viewer or editing, or sending the document as an electronic mail attachment, or printing other copies of the document or processing of the document by a software application.

In a further aspect of the invention, the method includes the step of placing a digital mark on the hardcopy, the digital mark containing identification information of the electronic document.

Another aspect of the invention provides a system for processing an electronic document corresponding to a hardcopy of the electronic document.

In a another aspect of the invention, the system includes: a data storage device that stores the electronic document; a mark encoder that encodes a mark on the hardcopy; an image capture device that captures an image of the hardcopy including a mark; a decoder, operatively connected to the image capture device, for decoding document identification information from the mark in the image captured by the image capture device; and a processing unit, connected to the decoder and the data storage device, that processes the electronic document in accordance with the decoded document identification information.

In another aspect of the invention, the processing unit processes the electronic document by either sending the electronic document as an electronic mail attachment, or printing a copy, or generating another electronic copy of the document.

In a further aspect of the invention, the mark encoder encodes a digital mark on the hardcopy.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

In a general aspect, the present invention offers the following advantages over known technologies in the prior art:

(i) it is a simpler than retrieving an electronic copy with manual data entry;

(ii) additional costs are insignificant, especially when compared to conventional bar code processing and manual data entry;

(iii) with the rapid lowering of computer hardware costs, the hardware and software for digital imaging and image processing systems are very affordable. Furthermore, with the expected rapid growth of other digital image driven systems, such as, for example, video conferencing, internet video phone, e-mails with attached video clips, this downward trend in costs and improvements in technology is likely to continue into the future.

Figure 1:
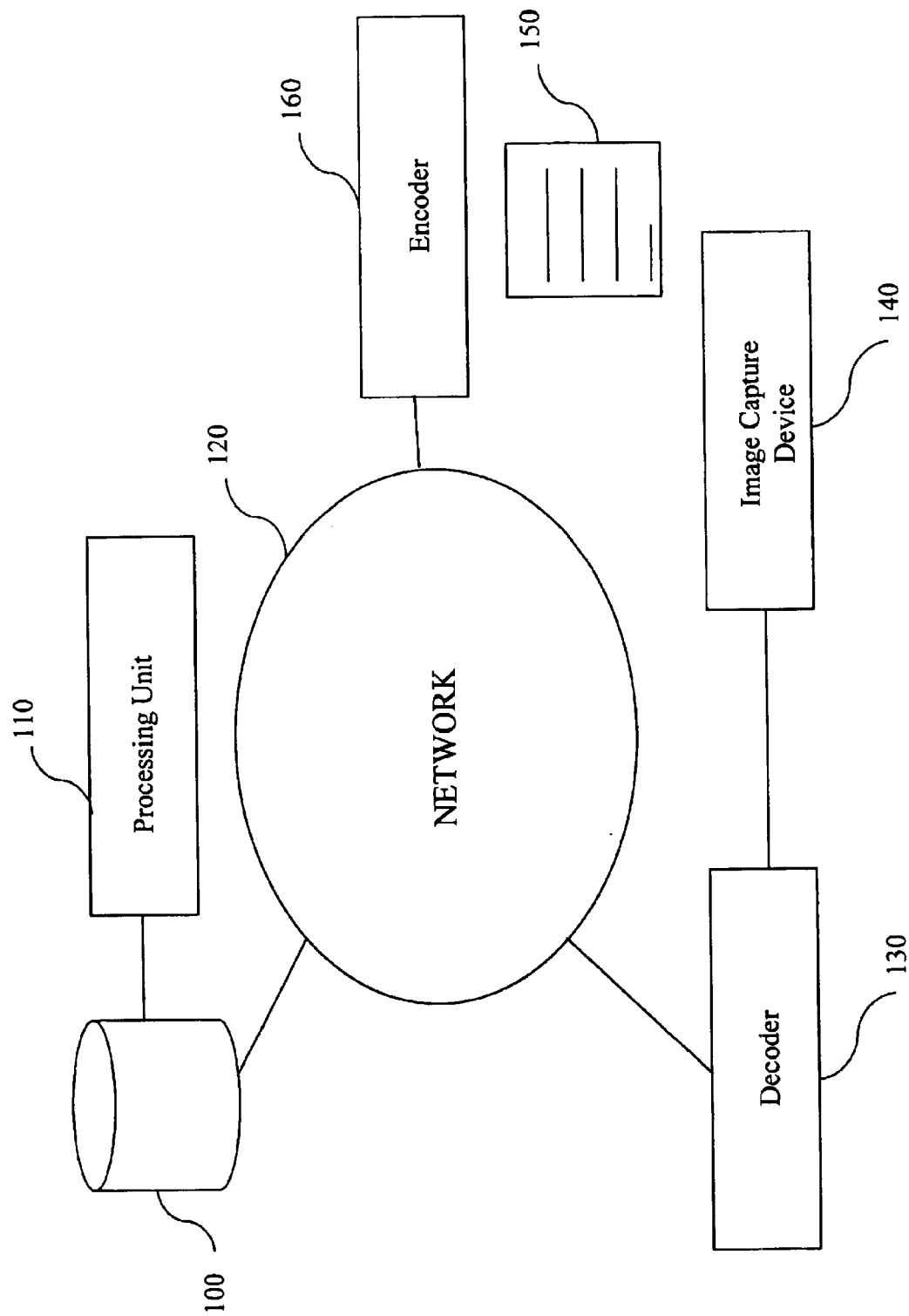
FIG. 1 is a schematic diagram illustrating the main components of a system for processing an electronic document corresponding to a hardcopy of the electronic document.

With reference to the figures, FIG. 1 is a schematic diagram illustrating a preferred embodiment of the main components of the system for processing an electronic document corresponding to a hardcopy of the electronic document.

The system includes a data storage device 100 that stores electronic documents. In the preferred embodiment, the data storage device 100 is also connected directly to a processing unit 110. However, one skilled in the art would recognize that the data storage device 100 could be set up to directly connect to a network 120 and be accessible by other applications through the network 120 using any communication means, including satellite or fiber-optic communication lines. The data storage device 100 includes any device that can store data in digital form and includes magnetic and optical devices, such as Redundant Array Storage devices, Magnetic and Optical Disk Drives, CD-ROMS, and other similar data storage devices.

The data stored in the data storage device 100 is organized by file management or database management software which is provided, in the preferred embodiment, on an attached processing unit 110. Furthermore, it is to be understood that the data may be stored in databases that are in a single database under the control of a single database management software or it may also be stored in distributed databases under the control of different database management software. In the case that the data is stored in different databases under the management of different database management software, appropriate middleware applications and technologies are used to co-ordinate and access the different databases.

The processing unit 110 is a general or special purpose computer having a CPU, memory, input/output and networking devices, and system and application software. The processing unit 110, in the preferred embodiment, creates the electronic document which can be any text, graphic, or other multimedia document or file. A hardcopy of 150 of the created document is encoded by an encoder 160 with a mark which, inter alia, identifies the location of the corresponding electronic document. In the preferred embodiment, the mark encoded on the hardcopy document is a digital mark.

In one embodiment of the encoder 160, the application creating the electronic document in the processing unit 110 may also encompass aspects of the encoder by encoding a digital mark on the electronic document so that the hardcopy print out 150 of the electronic document also has the digital mark. Details of a mark, including a digital mark, are separately discussed further herein.

In another embodiment, the encoder 160 can be a printer, including a commercial bulk printer, which prints the digital mark on the hardcopy document 150. Furthermore, the digital mark may also be transferred from one hardcopy to another hardcopy by copying using a photocopier. In such situations, the encoder 160 of the digital mark is a photocopier.

In accordance with the present invention, the hardcopy 150 is viewed by a image capture device 140 so that the image of hardcopy 150 can be captured by the image capture device 140. In a preferred embodiment, this is accomplished by waving or moving the hardcopy 150 in front of the image capture device 150 so that the image capture device 150 is activated to capture the image of the hardcopy document 140. In the preferred embodiment, the image capture devices 140 may be implemented by digital cameras and digital camcorders with relatively minor modifications. These minor modifications include, for example, a motion detector so that waving or moving a hardcopy document 150 in front of the image capture device 140 activates the image capture device 140 to capture an image of the hardcopy document 150. In addition, the image capture device 140 could also be a scanner attached to a cellular or wireless device so that the scanner is able to capture an image of the document and transmit the captured or decoded image using cellular or other wireless means.

The captured image is then processed by a decoder 130. In the preferred embodiment, the decoder 130 is a general purpose computer specially programmed to process the images captured by the image capture device 140. Therefore, in the preferred embodiment, the decoder 130 has a constantly running application (such as daemon process in the Unix environment, or a TSR in a Windows environment) which awaits an image from the image capture device 140. Once the decoder 130 receives an image from the image capture device 140, the specially programmed decoding application on the decoder processes the image to locate and parse the digital mark. It is to be understood that the decoder 130 and the image capture device 140 can also be connected by cellular or wireless means so that, for example, an image captured by a scanner attached to a cellular phone can be transmitted to the decoder 130 which may be at a remote location from the image capture device 140.

As discussed further herein, the digital mark can be created in several ways and at several locations on the hardcopy document 150. The specially programmed decoding application in the decoder 130 processes the image of the hardcopy document 150 using a logic corresponding to the logic used to create the digital mark to thereby locate and parse the digital mark. Therefore, depending on the type of the digital mark encoding technique, the decoding application may be programmed, for example, to only search for specific areas of the image to determine the presence of a digital mark. If the decoder 130 is unable to locate a digital mark on the image of the hardcopy document, the decoder provides an error message which indicates that the digital mark has not been found and default processing can be initiated.

It should be noted, that in the preferred embodiment, the decoder 130 is a separate, specially programmed computer connected to the image capture device 140. However, the present invention contemplates, in alternative embodiments, that the decoder 130 and the image capture device 140 could be combined in one device. Therefore, a special image capture device 140 could be constructed to supplement the normal image capture functioning with the image processing and decoding functionality provided in the decoder 130 of the preferred embodiment. Furthermore, in such an embodiment, the image processing and decoding logic can be performed in a combination of hardware and software implementations to maximize the speed of the decoding while maintaining the flexibility of a software programmed decoding device as is within the abilities of one skilled in the art. In addition, it is to be understood that although the decoder is shown as a single processor machine 130, it could be implemented by using distributed processors co-operating to achieve the image processing and decoding discussed with reference to the decoder 130.

The default processing if a digital mark is not located could be simply be to print out an error message. Other default processing could include transferring the image to a specific location or attaching the image file to an electronic mail and sending the image to a specified recipient.

If the decoder 130 is able to locate and parse the digital mark, the decoder 130 is provided with an address or identification information of the electronic document corresponding to the hardcopy document 150 from the parsed digital mark. Such an address could specify the machine name and file name where the electronic document is located. In another embodiment, the document identification (or location) information can be in the form of an URL (Uniform Resource Locator) that enables the location of a document on the World Wide Web of the Internet.

It should be noted that the network 120 is depicted as a typical computer network, such as a LAN, so that all the devices that are connected to the network 120 can directly communicate with each other. However, it should be understood that according to the present invention, the network 120 also includes Wide Area Networks (WAN) and other inter-connected networks (or inter-networks) such as the Internet. Therefore, the decoder 130 is able to locate the electronic file stored in the data storage device 100 from the document identification information decoded from the digital mark by the decoder 130. Furthermore, it is to be understood that the decoder 130 could also be connected to the image capture device 140 and to the network 120 using wireless means by using, for example, cellular or satellite technology.

In addition to the document identification information identifying the location of the electronic document, the digital mark can also be encoded with processing codes specifying the processing to be performed with the electronic document corresponding to the hardcopy having the encoded digital mark. For example, in a preferred embodiment, the decoder 130 could be programmed so that the electronic document, corresponding to the document identification information, is retrieved and displayed on a display device such as a computer screen or a monitor.

In other embodiments, the digital mark may contain information (corresponding to a processing code) that determines the processing of the electronic document once the electronic document has been located. Such processing can include, for example, that a copy of the electronic document is printed at a remote or specified location. Alternatively, the processing code can be interpreted to attach a copy of the electronic document to an electronic mail message so that the electronic document is sent to one or more users. In another embodiment, the electronic copy of the hardcopy document 150 can be copied to make another copy of the electronic document, for example, at another location for back up or archival purposes.

Therefore, the digital mark can be parsed to retrieve more information than just the location of the electronic copy. This additional processing information can be used to perform sophisticated processing of the electronic document corresponding to the processing code stored in the digital mark. Therefore, the additional processing information can be used to specify a software application that is to be executed with the electronic document. Accordingly, for example, the additional processing information could specify that an application such as Microsoft Excel could be invoked to process the electronic document corresponding to the hardcopy document and use the richer information that could be stored in, or associated with, the electronic document.

Furthermore, the additional information could also be used to enforce or monetize intellectual property rights. For example, the additional information could relate to copyright rights in the hardcopy documents and this information could be processed to determine royalty or other contractual payments related to a copyright license. The additional information could also be used for billing or revenue/cost allocation purposes. That is, the processing of the additional information contained in the digital mark can be used for a large variety of purposes by integrating the additional information with applications or processes designed to make use of the additional information contained in the digital mark.

Figure 2:
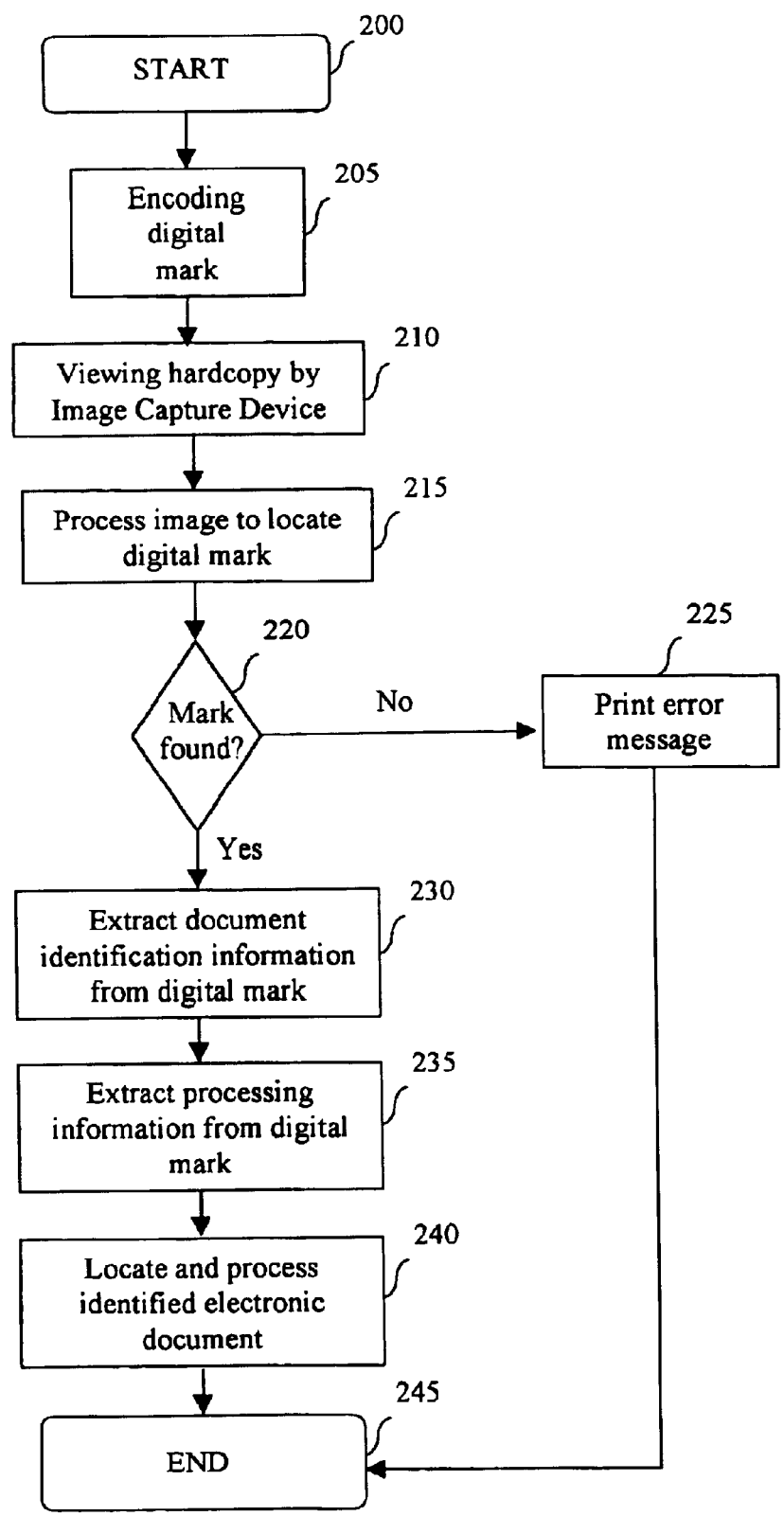
FIG. 2 is a flow diagram illustrating the steps of a method for processing an electronic document corresponding to a hardcopy of the electronic document.

FIG. 2 is a flow diagram illustrating the steps of a method for processing an electronic document corresponding to a hardcopy, according to another important aspect of the present invention. In step 205, a digital mark is placed on the hardcopy 150 of the document which has an electronic version of the document. The digital mark contains identification information identifying the location of the electronic version of the hardcopy document 150. In addition, the digital mark may also contain additional information, such as a processing code, which is used to determine the processing of the electronic document corresponding to the hardcopy document 150. As discussed earlier, the digital mark can be placed on the hardcopy 150 in several different ways. For example, it can be created at the same time as the creation or saving of the electronic document so that the digital mark is printed out when a hardcopy 150 of the electronic document is printed out. Alternatively, a printer can be programmed to place the digital mark, or the digital mark can be photocopied or otherwise transmitted from one hardcopy 150 to another. The digital mark can also be placed on the hardcopy during bulk printing by, for example, commercial printing presses.

In step 210, an image capture device 140 captures an image of the hardcopy 150, that is either waved or moved in its vicinity. This waving or moving action activates the image capture device 150 so that an image of the hardcopy is generated in a digital format. The image capture device according to the present invention includes digital cameras, digital camcorders and the like with relatively minor modifications as discussed earlier herein.

In step 215, the digital image captured by the image capture device 140 is processed by a decoder 130 that locates and parses the encoded digital mark. If in step 220, the decoder 130 is not able to locate the digital mark or is unsuccessful in parsing it, the decoder 130 proceeds to step 225 to produce an error message and exits at step 245.

On the other hand, if the decoder 130 locates and successfully parses the digital mark in step 220, it proceeds to step 230 to extract the electronic document identification or location information. Thereafter, in step 235, any other information contained in the digital mark is extracted. Such other information stored in the digital mark includes, for example, a processing code that indicates how the electronic document is to be processed.

In step 240, the electronic document corresponding to the hardcopy document 150 that is identified on the basis of the identification information is processed according to any processing information extracted from the digital mark. Such processing includes, for example, retrieving the electronic document for viewing or printing. The identified document may also be processed by transmittal or copying using electronic mail or other file transfer mechanisms. The identified document may also be processed by applications or processes that are designed to use the processing information stored in the digital marks. Therefore, special software applications may be invoked to process the electronic document and use additional information associated with the electronic document. The processing information may also be used to monitor, enforce or monetize intellectual property rights and/or be used for revenue/cost allocation purposes. That is, the processing information can be used in a variety of different uses by applications and processes designed to use the processing information contained in the digital marks.

Alternatively, if no processing information is extracted from the digital mark the electronic document undergoes default processing. Such default processing includes the display of the electronic document on a computer display or monitor. Thereafter, the process terminates at step 245.

Mark

The mark or digital mark discussed above is any machine readable code that can be formed on the medium or substrate on which the hardcopy 150 of the document is printed. It should be noted that numerous methods are available for providing a machine-readable code on a medium or a substrate. One class of methods is to hide the code within the primary image. Such hiding can be accomplished by utilizing particular digital encoding, such as, for example, font pattern modifications, including, half-tone screen, inter-character spacing modification, and dithering patterns. Another method is to place the machine-readable code on a portion of a document that is not normally printed upon with a primary image. Such portions can include, for example, one or more of the corners of a document. The machine-readable code can be stored in such portion, as for example a pattern of dots or lines. Such pattern could, for example comprise a barcode. Note that if hidden or camouflaged machine-readable code is used, the camouflaged code can be in the form of half-tone marking within an image prepared on the substrate, or in the form of an ink which is not visible when viewed with only visible wavelength light, i.e., for example an ink that is visible only using infrared or ultraviolet wavelengths.

Alternatively, the code could be formed by having a person write the code on the substrate.

It should be noted that the machine-readable code may be located anywhere on the substrate or the medium including the top portion, a bottom portion, side margins of a document, or in an image like a company logo or with a photograph, or in or adjacent to a copyright notice.

In applications where a barcode is utilized, large amounts of data can be encoded by utilizing two-dimensional barcodes. In applications where a person writes the code on the substrate, the code may be machine-readable when read with a machine coupled with handwriting-recognition software.

In applications where the code on the substrate or medium comprises a reference to a location of data objects in a database, the code may comprise simply a serial number, an access code, or a URL address corresponding to an Internet location at which the data objects are stored. These data objects can then be accessed through a network connection. In particular applications, the machine-readable code can be formed on a substrate with a machine configured to support voice input and to mark or annotate the substrate for further action/workflow.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A method of processing an electronic document corresponding to a hardcopy of the document, comprising the steps of:

creating and storing the electronic document;

receiving a voice input indicative of an annotation or processing instruction for the document;

placing a mark on the hardcopy corresponding to the stored electronic document, the mark containing identification information for retrieval of the stored electronic document and the annotation or processing information of the electronic document received from the voice input;

viewing the hardcopy by an image capture device to capture an image of the hardcopy document;

decoding the mark from the image captured by the image capture device to determine the identification information of the electronic document and the processing information of the electronic document;

retrieving the electronic document based on the determined identification information of the electronic document; and processing the retrieved electronic document according to the annotation or processing information for the document received from the voice input.

2. The method according to claim 1, wherein the step of placing a mark on the hardcopy is performed by creating the mark at the time of creation of the electronic document and wherein the hardcopy, with the mark, is printed from the electronic document.

3. The method according to claim 1, wherein the step of placing a mark is performed by a printer that prints a digital mark on the hardcopy document.

4. The method according to claim 1, wherein the step of placing a mark is performed by copying the hardcopy having a mark to create another hardcopy with the mark.

5. The method according to claim 1, wherein the mark is a bar code.

6. The method according to claim 5, wherein the mark is a two dimensional bar code.

7. The method according to claim 1, wherein the step of processing the document includes retrieving the document for viewing.

8. The method according to claim 1, wherein the step of processing the document includes the step of mailing the document by electronic mail.

9. The method according to claim 1, wherein the step of processing the document includes the step of the printing the document.

10. The method according to claim 1, wherein the step of processing the document includes the step of making a copy of the electronic document.

11. The method according to claim 1, wherein the mark is machine readable code formed on a substrate on which the hardcopy is printed.

12. The method according to claim 11, wherein the machine readable code is formed using font pattern modification including one of a half-tone screen, inter-character spacing modification, and dithering patterns.

13. The method according to claim 11, wherein the machine readable code is formed on a particular location in the hardcopy document.

14. The method according to claim 1, wherein the mark is a digital mark.

15. The method according to claim 1, wherein the step of placing a mark is performed by a printing press that prints the mark during bulk printing.

16. The method according to claim 1, wherein the step of processing the electronic document includes invoking a software application to process the electronic document.

17. The method according to claim 1, wherein the step of processing the electronic document includes identifying and processing based on any intellectual property rights associated with the hardcopy documents.

18. The method according to claim 1, wherein the step of processing the electronic document includes calculating and allocating revenues or costs associated with the hardcopy document.

19. A system for processing an electronic document corresponding to a hardcopy of the electronic document, the system comprising:

a data storage device that stores the electronic document;

a device for receiving a voice input indicative of an annotation or processing instruction for the electronic document;

a mark encoder that encodes a mark on the hardcopy corresponding to the stored electronic document, the mark indicative of identification information for retrieval of the stored electronic document and the annotation or processing information for the electronic document received from the voice input;

an image capture device that captures an image of the hardcopy including the mark;

a decoder, operatively connected to the image capture device, for decoding the identification information and the annotation or processing information from the mark from the image captured by the image capture device; and a processing unit, connected to the decoder and the data storage device, that retrieves the electronic document based on the identification information and processes the electronic document in accordance with the decoded processing information for the electronic document received from the voice input.

20. The system according to claim 19, wherein the processing unit processes the electronic document by one of sending by electronic mail, printing, or copying of the electronic document.

* * * * *